(12) United States Patent
Knas et al.

(10) Patent No.: US 11,828,732 B1
(45) Date of Patent: Nov. 28, 2023

(54) AUDIO SENSOR BASED VEHICLE FAULT DIAGNOSTICS SYSTEM

(71) Applicant: MASSACHUSETTS MUTUAL LIFE INSURANCE COMPANY, Springfield, MA (US)

(72) Inventors: Michal Knas, Monson, MA (US); Damon Ryan Depaolo, Barkhamsted, CT (US); Payton A. Shubrick, Springfield, MA (US); Jiby John, Suffield, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 995 days.

(21) Appl. No.: 16/426,604

(22) Filed: May 30, 2019

(51) Int. Cl.
*G01N 29/44* (2006.01)
*G10L 25/51* (2013.01)
*G07C 5/00* (2006.01)
*G07C 5/08* (2006.01)

(52) U.S. Cl.
CPC ..... *G01N 29/4427* (2013.01); *G01N 29/4445* (2013.01); *G07C 5/008* (2013.01); *G07C 5/0808* (2013.01); *G10L 25/51* (2013.01)

(58) Field of Classification Search
CPC .......... G01N 29/4427; G01N 29/4445; G07C 5/008; G07C 5/0808; G10L 25/51
See application file for complete search history.

(56) References Cited

U.S. PATENT DOCUMENTS

| | | | |
|---|---|---|---|
| 2007/0250228 A1* | 10/2007 | Reddy | B60R 25/00 701/2 |
| 2014/0324275 A1* | 10/2014 | Stanek | G07C 5/008 701/31.4 |
| 2018/0158288 A1* | 6/2018 | Logan | G08B 25/10 |
| 2018/0350167 A1* | 12/2018 | Ekkizogloy | B60R 11/0247 |

* cited by examiner

*Primary Examiner* — James J Yang
(74) *Attorney, Agent, or Firm* — Foley & Lardner LLP

(57) ABSTRACT

Disclosed herein is a system for diagnosing faults in a vehicle using multiple audio sensors. The audio sensors are placed in predetermined locations within the vehicle. The audio sensors continually detect sound signals being originated from components of the vehicle. The audio sensors process detected sound signals to remove unwanted noise from the detected sound signals. The audio sensors compare processed sounds signals with reference sound signals to identify one or more faulty components. Each reference sound signal is associated with a particular fault. The audio sensors transmit information associated with the one or more faulty components to an analyst computer. An interactive graphical user interface of the analyst computer may present the information to an analyst.

20 Claims, 6 Drawing Sheets

AUDIO SENSOR BASED VEHICLE FAULT DIAGNOSTICS SYSTEM

TECHNICAL FIELD

This application relates generally to a vehicle fault diagnostics system and more particularly to a fault diagnosis method for detection of faults associated with components of a vehicle using electronic audio sensors.

BACKGROUND

A driver may take a vehicle to a repair shop for diagnosis. The driver explains to a mechanic sounds from the vehicle to assist in performing the diagnosis. It can be very difficult for the driver to explain those sounds and their origin. Additionally, some of the sounds originating in the vehicle may not be audible to the driver while the driver is driving the vehicle. As a result, the driver is unable to communicate all the sounds coming out of the vehicle to the mechanic for performing the diagnosis. Accordingly, the mechanic spends a substantial amount of time and resources in inspecting the vehicle to diagnose mechanical or other malfunctions associated with components of the vehicle. Therefore, time-based diagnosis of the malfunctions in the vehicle is proving to be a growing challenge, and as the complexity of vehicles increases, it can become increasingly difficult to diagnose an unusual sound.

SUMMARY

Disclosed herein are vehicle fault diagnostics systems and methods capable of addressing the above-described shortcomings by equipping a vehicle with one or more electronic audio sensors. The electronic audio sensors may monitor and detect sound signals, such as noises and vibrations coming from components of the vehicle. The electronic audio sensors may perform auditory diagnosis of the vehicle by identifying mechanical or electrical faults associated with the components based on processing of detected sound signals. The processing may include comparing of the detected sound signals with reference sounds signals associated with known mechanical or electrical faults. The electronic audio sensors may present identified mechanical or electrical faults on a graphical user interface of a control unit within the vehicle.

When the electronic audio sensors are not able to identify any mechanical or electrical faults corresponding to the detected sound signals, the electronic audio sensors may record the detected sounds signals. The electronic audio sensors may generate sound sensor data records using recorded sound signals. The electronic audio sensors may transmit the sound sensor data records to a server over an internal data link. The server may feed the sound sensor data records in a sound analyzer device to identify the mechanical or electrical faults associated with the components. In some cases, the server may execute a protocol on the sound sensor data records to potentially associate different types of the sound signals within the sound sensor data records with different types of the mechanical or electrical faults associated with different types of the components. The server may then identify potential mechanical or electrical faults associated with the components based on the execution of the protocol. The server may present identified mechanical or electrical faults in the vehicle on a graphical user interface of an analyst computer.

In one embodiment, a system may include a vehicle comprising a plurality of components generating one or more types of sound signals. The system may further include one or more sensors associated with the plurality of components are configured to sense and identify one or more known sound signals from the one or more types of sound signals, wherein the one or more known sound signals correspond to one or more first faults associated with at least one of the plurality of components, and record one or more unknown sound signals from the one or more types of sound signals to generate sensor data. The system may further include a server configured to receive the sensor data from the one or more sensors and process the sensor data to identify one or more second faults associated with at least one of the plurality of components.

In another embodiment, a method may include identifying, by one or more sensors in a vehicle, one or more known sound signals from one or more types of sound signals generated by a plurality of components of the vehicle, wherein the one or more known sound signals correspond to one or more first faults associated with at least one of the plurality of components; recording, by the one or more sensors, one or more unknown sound signals from the one or more types of sound signals to generate sensor data; and transmitting, by the one or more sensors, the sensor data to a server, wherein the server processes the sensor data to identify one or more second faults associated with at least one of the plurality of components.

In yet another embodiment, a system may include one or more sensors, each sensor positioned near one of a plurality of components on a vehicle operated by a user, the one or more sensors configured to: sense a sound signal from a component of the plurality of components; compare a portion of the sound signal with a set of known sound signals, the set of known sound signals comprising a first subset of known sound signals and a second subset of known sound signals, the second subset of known sound signals correspond to operational sounds associated with the plurality of components, and the first subset of known sound signals correspond to one or more faults associated with at least one of the plurality of components; when the portion of the sound signal match a first known sound signal of the first subset of known sound signals, identify a fault associated with the first known sound signal and display the fault on a graphical user interface of an electronic device of the user; and when the portion of the sound signal does not match any of the set of known sound signals, generate and transmit an electronic message to the electronic device, the electronic message indicating an anomaly in at least one of the plurality of components based on detection of the sound signal.

In yet another embodiment, a method may include sensing, by a sensor positioned near one of a plurality of components on a vehicle operated by a user, a sound signal from a component of the plurality of components; comparing, by the sensor, a portion of the sound signal with a set of known sound signals, the set of known sound signals comprising a first subset of known sound signals and a second subset of known sound signals, the first subset of known sound signals correspond to one or more faults associated with at least one of the plurality of components, and the second subset of known sound signals correspond to operational sounds associated with the plurality of components; when the portion of the sound signal match a first known sound signal of the first subset of known sound signals, identifying, by the sensor, a fault associated with the first known sound signal and display the fault on a graphical user interface of an electronic device of the user; and when the portion of the sound signal does not match any of the set of known sound signals, generating and transmitting, by the sensor, an electronic message to the electronic device, the electronic message indicating an anomaly in the plurality of components based on detection of the sound signal.

It is to be understood that both the foregoing general description and the following detailed description are explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

DETAILED DESCRIPTION

Figure 1A:
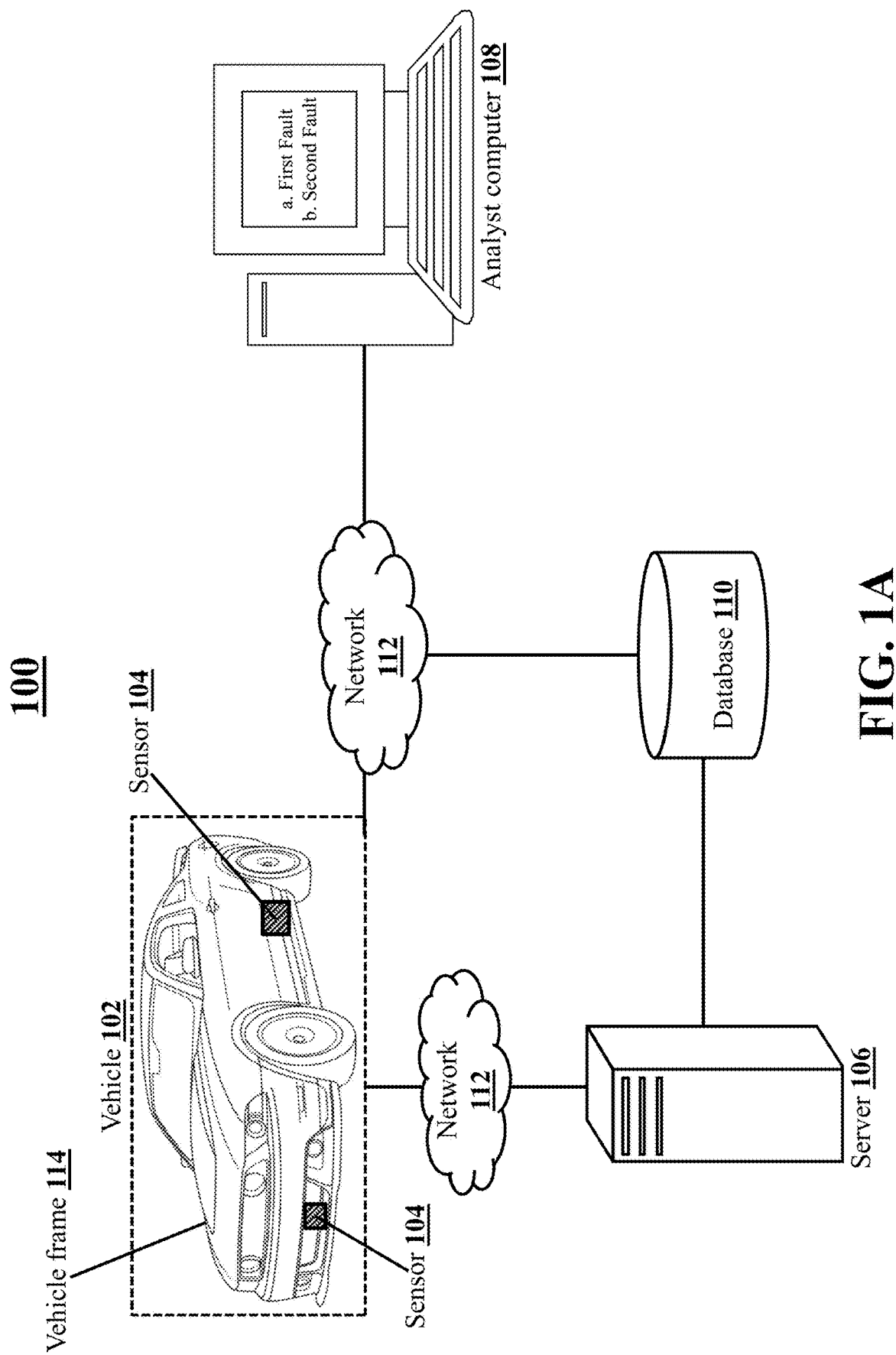
FIG. 1A shows a vehicle fault diagnostics system for identifying faults in a vehicle, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

A method and a system for diagnosing faults in a vehicle using multiple electronic audio sensors is disclosed. The audio sensors may be sound sensors having reference sound signals stored in their memory. The reference sounds signals may be associated with one or more faulty components of the vehicle. The audio sensors may be placed in predetermined locations within the vehicle. The predetermined locations within the vehicle may include positions adjacent to sound generating components of the vehicle. The audio sensors may continually detect sound signals being originated from the components of the vehicle. The audio sensors may pre-process detected sound signals to remove any unwanted noise from the detected sound signals. The audio sensors may compare pre-processed sounds signals with the reference sound signals to identify the one or more faulty components. Upon the identification of the one or more faulty components, the audio sensors may transmit information associated with the one or more faulty components to an electronic display screen within the vehicle and/or an analyst computer. The information may also include a date and a time of detection of the one or more faulty components. The electronic display screen and/or an interactive graphical user interface of the analyst computer may present the information.

Figure 1B:
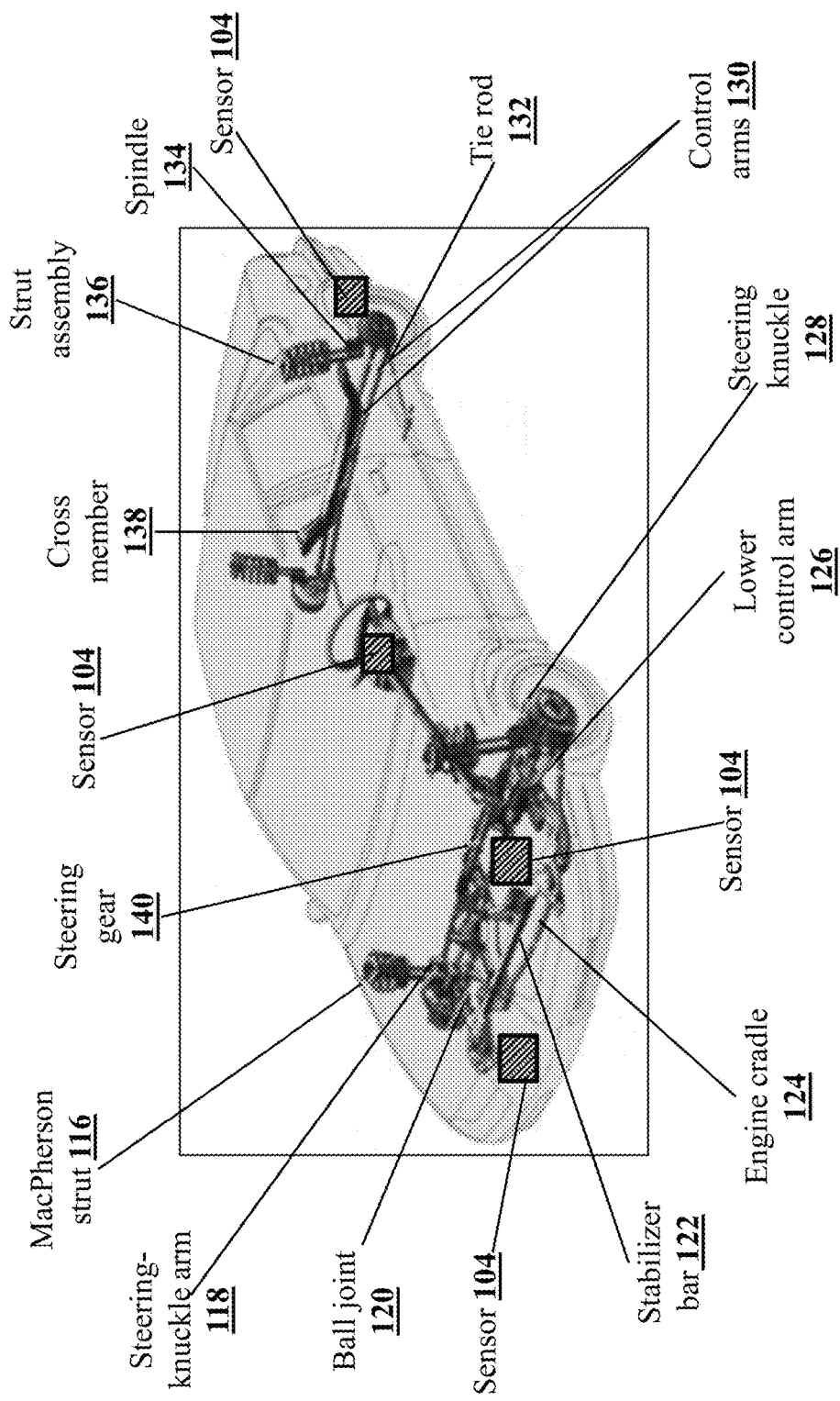
FIG. 1B shows a vehicle of a vehicle fault diagnostics system, according to an embodiment.
Figure 1C:
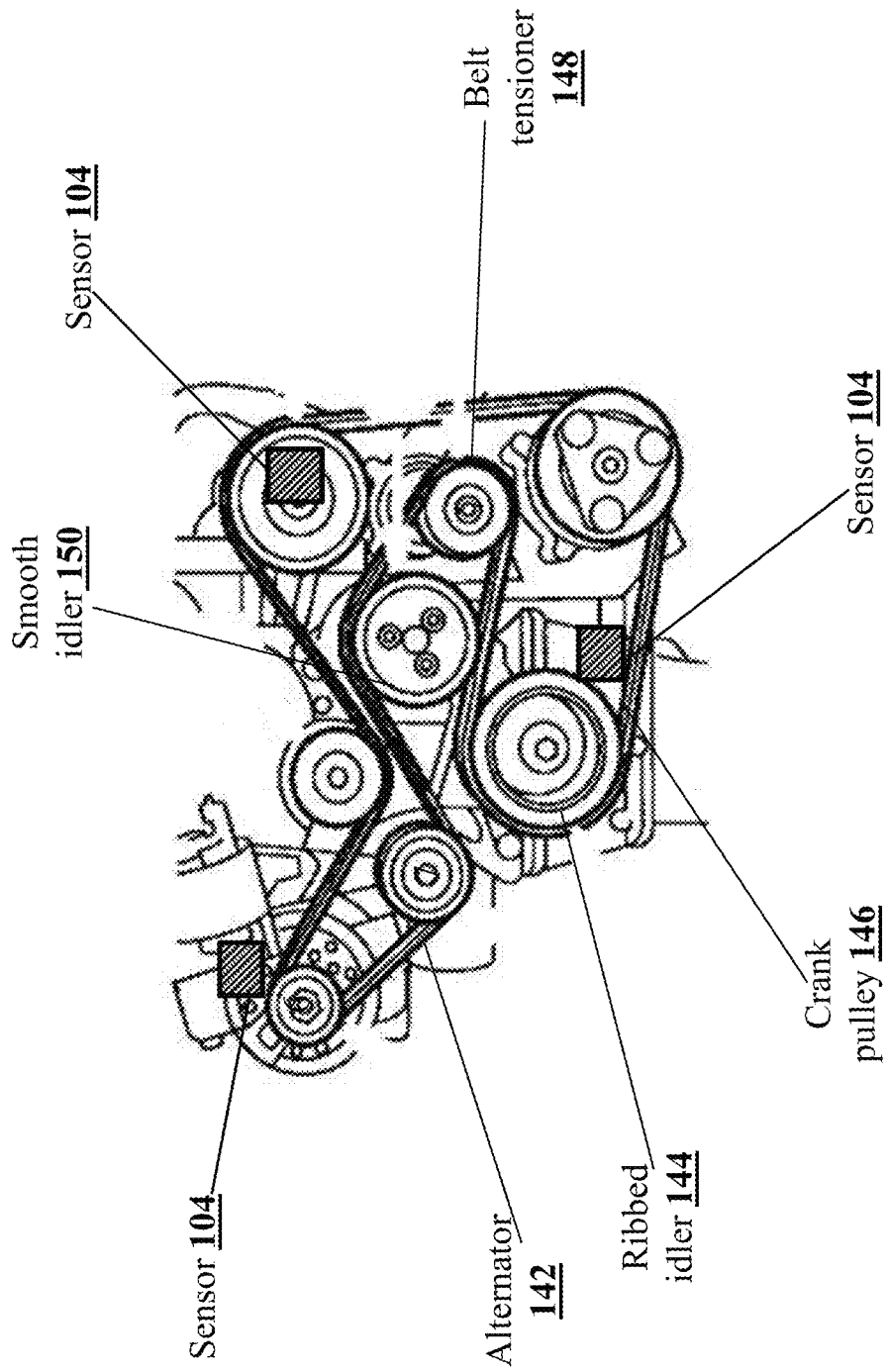
FIG. 1C shows multiple components of a vehicle of a vehicle fault diagnostics system, according to an embodiment.

FIGS. 1A-1C show a vehicle fault diagnostics system 100. The vehicle fault diagnostic system 100 may include a vehicle 102 equipped with one or more sensors 104 and a control unit. The vehicle fault diagnostics system 100 may further include a server 106, an analyst computer 108, and a database 110. In a non-limiting example, some or all of the functionalities of the vehicle fault diagnostics system 100 can be implemented as a software application or as an application programming interface between an operating system and a multimedia web application in the vehicle 102.

The sensors 104, the control unit, the server 106, the analyst computer 108, and the database 110 communicate with each other over a network 112. The network 112 may include, but is not limited to, private or public local area network, wireless local area network, metropolitan area network, wide-area network, and the Internet. The network 112 may further include both wired and wireless communications according to one or more standards via one or more transport mediums. The communication over the network 112 is in accordance with various communication protocols such as transmission control protocol and internet protocol, user datagram protocol, and institute of electrical and electronics engineers communication protocols. The network 112 may further include wireless communications according to Bluetooth specification sets, or another standard or proprietary wireless communication protocol. The network 112 may further include communications over a cellular network, including, for example, a global system for mobile communications, code division multiple access, and enhanced data for global evolution network.

The vehicle fault diagnostics system 100 is described in a context of sensor-executable instructions, such as sensor modules, being executed by the sensors 104. The sensor modules may include software programs, objects, components, data structures, etc. that perform particular fault detection tasks or implement particular abstract data types. The features of the vehicle fault diagnostics system 100 may be practiced either in a server device or in a distributed server environment, where the fault detection tasks are performed by processing devices associated with sensors 104, which are linked through the network 112. In the distributed server environment, the sensor modules may be located in both local and remote computer storage media including memory storage devices.

The vehicle fault diagnostics system 100 may operate (e.g., may be implemented) in a local computing environment where the server 106 or the analyst computer 108 may generate various fault detection tasks, and the sensors 104 may execute the various fault detection tasks. The database 110 and application programs associated with the sensors 104 may be stored and executed on local computing resources. The sensors 104 may locally query the database 110 to retrieve reference sound signals associated with one or more faults in one or more components of the vehicle 102. The database 110 may store records of the reference sound signals, which are summarized according to an identifier associated with the one or more components of the vehicle 102. Optionally, the records that store the reference sound signals may include only a portion of a repetitive sound. The records may also include metadata, such as vehicle speed, engine temperature, outside temperature, oil pressure, and the like. This metadata may be further used to compare sounds in similar conditions. The sensors 104 may associate and compare sound signals detected within the vehicle 102 with the reference sound signals to identify the faults corresponding to the components in the vehicle 102. The sensors 104 may present the faults on an interactive graphical user interface of the analyst computer 108 and a display screen within the vehicle 102.

The vehicle fault diagnostics system 100 may operate in a cloud-computing environment where the sensors 104, the analyst computer 108, and the server 106 may be cloud-optimized. The server 106 or the analyst computer 108 may execute a vehicle diagnosis software application to generate and transmit a request to the sensors 104. The request may be associated with various fault detection tasks in the vehicle 102. The vehicle diagnosis software application and the sensors 104 data and application programs may be stored and executed on the remote cloud-based server 106 accessed over a network cloud. In operation within the cloud-computing environment, a web browser on the analyst computer 108 may interface with an application program corresponding to the vehicle diagnosis software application, which is executed on the remote cloud-based server 106. Utilizing the web browser executing on the analyst computer 108, the analyst may generate the request. The analyst may transmit the request to the sensors 104 via the remote cloud-based server 106 and other application programs. The sensors 104 may detect the sound signals in the vehicle 102 based on the request and then query the database 110 to retrieve the reference sound signals. The sensors 104 may associate and compare detected sound signals with the reference sound signals to identify the faults corresponding to the components in the vehicle 102. The sensors 104 may present the faults on an interactive graphical user interface of the analyst computer 108 and a display screen within the vehicle 102.

A vehicle 102 may include a vehicle frame 114, which is a supporting structure of the vehicle 102. The vehicle frame 114 may support multiple components of the vehicle 102 The components may include a MacPherson strut 116, a steering knuckle arm 118, a ball joint 120, a stabilizer bar 122, an engine cradle 124, a lower control arm 126, a steering knuckle 128, control arms 130, a tie rod 132, a spindle 134, a strut assembly 136, a cross member 138, and a steering gear 140. The components may further include an alternator 142, a ribbed idler 144, a crank pulley 146, a belt tensioner 148, and a smooth idler 150.

The vehicle 102 may include a control unit. The control unit is connected to a data bus to control various items of electrical equipment installed in the vehicle 102. The control unit is provided for controlling lights, cameras, recorders, the sensors 104, etc. The control unit may include a software memory storing an interface software program for connecting an application software program, such as the vehicle diagnosis software application with an operating system. The control unit may further include a central processing unit having microprocessors for performing computation of the application software program and the interface software program. The control unit may be associated with a display screen and input devices. The input devices may include switches, touchscreens, keyboards, pointer devices, or other devices. The input devices may be used to enable, disable, or adjust settings of the vehicle fault diagnostics system 100. For example, the input devices may be used to activate the recorders, the cameras, and the sensors 104.

Sensors 104 may be electronic devices configured to emit sensor waves, which may recognize and identify sound signals within a predetermined range. Based upon particular types of sensor waves used and particular protocols associated with the sensor waves, the sensors 104 may generate sensor data associated with identified sound signals within the predetermined range of the sensors 104. Non-limiting examples of sensor technologies associated with the sensors 104 may include audio technology, voice technology, ultrasonic technology, laser technology, optical technology, Doppler technology, and accelerometer technology. Non-limiting examples of the sound signals processed by sound recognition-enabled sensors 104 may include sound signal data, noise signal data, wind signal data, voice signal data, etc.

The sensors 104 may be placed in different locations in the vehicle 102 where each sensor 104 may have a capability to detect the sound signals and generate different types of the sensor data associated with different types of detected sound signals in various audio data formats. In one embodiment, the sensors 104 may be positioned within the vehicle 102 such that the sensors 104 may be directly associated with the different components of the vehicle 102. In another embodiment, the sensors 104 may be positioned within the vehicle 102 such that the sensors 104 may be indirectly associated with the different components of the vehicle 102. In yet another embodiment, the sensors 104 may be an integral part of the different components of the vehicle 102. Each sensor 104 located within the vehicle 102 may include a sensor processor, a sensor memory, a microphone, and a communications component. In some embodiments, a plurality of sensors 104 may share the sensor processor, the sensor memory, the microphone, and the communication component.

The sensors 104 placed in different locations in the vehicle 102 may be categorized by a sensor type, characteristic hardware and software requirements, and capabilities for detection of the sound signals. In one non-limiting example, the sensors 104 may be characterized as passive sensors, active sensors, and smart sensors. The passive sensors may provide minimal but efficient sound discrimination while identifying the sound signals within the predetermined range. The passive sensors may be used as secondary sensors, which may be dispersed within the predetermined range of the passive sensors. The passive sensors may be part of the components of the vehicle 102 or otherwise independently capture raw sensor data associated with the sound signals that may be wirelessly communicated to a sensor processor and/or the server 106. The active sensors may provide efficient and effective sound discrimination while identifying the sound signals within the predetermined range of the active sensors, and may have minimal processing associated with the sensor data produced by the active sensors. The smart sensors may have an on-board digital signal processing for primary sensor data associated with the sound signals (i.e., prior to processing by the server 106). The digital signal processing is capable of fine, granular sound discrimination and provide the server 106 with pre-processed sensor data associated with the sound signals that is more efficiently handled by the server 106.

The sensors 104 may include the microphone. In one embodiment, the microphone may be directly associated with the sensors 104. In another embodiment, the microphone may be indirectly associated with the sensors 104. In yet another embodiment, the microphone may be an integral part of each sensor 104. The microphone may include a microphone processor and a microphone memory. The microphone may detect or receive the sound signals originating from the components of the vehicle 102. In one embodiment, upon detection of the sound signals, the microphone may automatically activate a recorder associated with the microphone, which may start recording of detected sound signals. In another embodiment, the microphone may have an inbuilt recorder and the inbuilt recorder may automatically start recording of the detected sounds signals. The microphone may automatically stop the recording of the detected sound signals after a predetermined interval of time. The microphone may store recorded sound signals in the microphone memory. The recorded sound signals may include information associated with a start time and an end time of the recording of the detected sound signals.

The microphone processor may analyze the detected sound signals to identify a direction of the detected sound signals received by the microphone. The microphone processor may also estimate an angle of the sound signals traveling toward the microphone from the components of the vehicle 102. Based on the direction and the angle of the detected sound signals, the microphone processor may activate one or more camera devices within the vehicle 102 to capture image data of the one or more components in the identified direction. The one or more camera devices may store the image data in the sensor memory. The one or more camera devices may also transmit the image data to the sensor processors.

When the microphone detects the sound signals within the predetermined range of associated sensors 104, the microphone processor may execute instructions to convert the detected sound signals into an electrical signal. In one embodiment, the microphone may include an amplifier, which may be configured to process and amplify the detected sound signals. The amplifier may be electronic circuitry within the microphone, or to a separate device or circuit that the microphone is connected to. The microphone processor may then execute instructions to convert amplified sound signals into the electrical signals. In another embodiment, the microphone may include an analog to digital converter, which may be configured to process and convert the detected sound signals into digital signals. The analog to digital converter may be electronic circuitry within the microphone, or to a separate device or circuit that the microphone is connected to. The microphone processor may then execute instructions to convert digital sound signals into the electrical signals. The microphone processor may store reformed sound signals associated with the electrical signal in the sensor memory. The microphone may transmit the reformed sound signals to the sensor processors.

The sensor processors may include a processing unit. The processing unit may include multiple processors with computer-readable medium, such as a random access memory coupled to the multiple processors. The sensor processor may be running algorithms or computer executable program instructions. The sensor processor may interact with one or more software modules of a same or a different type operating within the vehicle fault diagnostics system 100. The sensor processor may include a microprocessor, an application specific integrated circuit, and a field programmable object array, among others.

The sensor processors may directly receive the sound signals from the microphone processor. The received sound signals may be the detected sound signals or the reformed sound signals. The detected sound signals or the reformed sound signals may be implemented as discrete analog or digital sound signals with appropriate signal processing to process separate streams of the sound signals. In some embodiments, the sensor processors may receive a notification or an alert from the microphone processor when the microphone processor may store the detected sound signals or the reformed sound signals in the sensor memory. The sensor processors may then access the sensor memory and retrieve the detected sound signals or the reformed sound signals from the sensor memory.

The sensor processors may be programmed to interpret and process the sound signals received from the microphone processor. Initially, the sensor processors may execute software instructions on the sound signals to pre-process the sound signals. The software instructions may include digital signal processing instructions. During the pre-processing step, the sensor processors may remove unwanted noise from the sound signals that results from an operation of the vehicle 102. The sensor processors may use a predefined filter to remove the unwanted noise from the sound signals in order to isolate audio data that is intended to be included in the sound signals, from the unwanted noises that result from the regular operation of the vehicle 102. The predefined filter may operate with a set of filter parameters. The set of filter parameters may be applied on the sound signals based on noise type parameters, noise level parameters, and other parameters associated with the sound signals.

The sensor processors may use the predefined filter to modify the sound signals to filter or cancel the unwanted noise from the sound signals. In a first non-limiting example, the unwanted noise may be a voice of driver of the vehicle 102 and the voice is then removed from the sound signals. In a second non-limiting example, the unwanted noise may be wind noise, such as wind interference with the sound signals. The sensor processors may remove the wind noise from the sound signals. In a third non-limiting example, the unwanted noise may be regular noises of some of the components of the vehicle 102 and the regular noises are then removed from the sound signals. When the unwanted noise from all the sound signals is removed, the sensor processors may generate pre-processed sound signals. The sensor processors may store the pre-processed sound signals in the sensor memory.

The sensor processors may adjust the pre-processed sound signals by increasing prompt level (for example, a volume), altering prompt pitch, shaping a prompt spectrum, reshaping the prompt spectrum, enhancing playback, and/or otherwise enhancing or altering the pre-processed sound signals. The sensor processors may further execute a control algorithm on the pre-processed sound signals to standardize the pre-processed sound signals. The control algorithm may include one or more audio standardization programs. The sensor processors may store adjusted and standardized sound signals in the sensor memory.

The sensor processors may execute one or more fault identification protocols using the sound signals as an input to perform various processes on the sound signals and thereby identify one or more faults associated with the sound signals. The sound signals may be the adjusted and the standardized sound signals. In operation, when a first microphone associated with a first sensor detects first sound signals, the sensor processors may be programmed to process the first sound signals received from the first microphone using a first fault identification protocol. The first fault identification protocol may include first programs to process the first sound signals received from the first microphone. The first programs maybe trained to associate a set of first reference sound signals with a set of first faults in a set of first components of the vehicle 102. The server processors may identify one or more first faults associated with one or more first components of the vehicle 102 based on a processing of the first sound signals using the first fault identification protocol. Similarly, when a second microphone associated with a second sensor detects second sound signals, the sensor processors may be programmed to process the second sound signals received from the second microphone using a second fault identification protocol. The second fault identification protocol may include second programs to process the second sound signals received from the second microphone. The second programs maybe trained to associate a set of second reference sound signals with a set of second faults in a set of second components of the vehicle 102. The server processors may identify one or more second faults associated with one or more second components of the vehicle 102 based on a processing of the second sound signals using the second fault identification protocol.

The sensor processors may search the sensor memory, which is configured to store the reference sound signals using each sound signal as an input. Each sound signal may be the adjusted and the standardized sound signal. In some embodiments, the sensor processor may search the database 110 storing the reference sound signals using each sound signal as the input. Each reference sound signal stored in the sensor memory or the database 110 may be associated with at least one fault in at least one component of the vehicle 102. In response to execution of the search process, the sensor processors may match inputted sound signals with the reference sound signals. The sensor processors upon determining that a first inputted sound signal is same as a first reference sound signal, the sensor processors may then identify a first fault that is associated with the first reference sound signal. The first fault may be a brake problem in a brake of the vehicle 102. Similarly, the sensor processors upon determining that a second inputted sound signal is same as a second reference sound signal, the sensor processors may then identify a second fault that is associated with the second reference sound signal. The second fault may be an engine problem in an engine of the vehicle 102. The sensor processors may designate the inputted sound signals, such as the first inputted sound signal and the second inputted sound signal as known sound signals when the faults associated with such sound signals is determined. The sensor processors may store information associated with the known sound signals in the sensor memory or the database 110.

When the sensor processors do not find any match for some of the inputted sound signals in the sensor memory or the database 110 storing the reference sound signals, the sensor processors may designate such inputted sound signals as unknown sound signals. The sensor processors may execute one or more sound data conversion algorithms on the unknown sound signals to generate the sensor data, such as sound signal sensor data. The sensor processors may store the sensor data in the sensor memory or the database 110.

The sensor processors may transmit the sensor data to the server 106 for subsequent processing by the server 106. Although described in the embodiment as raw sensor data, it is intended that the sensor data is not limited to the raw sensor data. The sensor data may include information, which is processed by the sensor processors using one or more processing models. The sensor data may include some information derived from the sensors 104, such as name of the sensors 104 and location of the sensors 104 within the vehicle 102 that detected and captured the unknown sound signals. The sensor data may be incorporated with additional information, such as the image data of the one or more components from where the unknown sound signals probably originated.

The sensor memory may be a non-volatile storage device for storing data, such as the sensor data and instructions to be used by the sensor processors. The data may further include information associated with the reference sound signals, the known sound signals, and the unknown sounds signals. The sensor memory may store a relationship between a plurality of different types of known sound signals and a plurality of faults. The memory may be implemented with a magnetic disk drive, an optical disk drive, a solid-state device, or an attachment to a network storage.

The communications component may effectuate wired and/or wireless communications to and from each sensor 104. The communications component may be an embedded component of each sensor 104. The communications component may be attached to each sensor 104 through a wired or wireless communications medium. The communications component may be shared among a plurality of sensors 104 such that each of the sensors 104 coupled to the communications component may use the sensor data received within a communications signal by the communications component.

The communications component may include electromechanical components (e.g., a processor, an antenna), which may allow the communications component to communicate the sensor data with the server 106, the identified faults with the analyst computer 108, and the identified faults with the control unit of the vehicle 102. In some implementations, the communications signals may represent a distinct channel for hosting communications, independent from the sensor waves. The sensor data and the identified faults may be communicated using the communications signals based on predetermined wired or wireless protocols and associated hardware and software technology. The communications component may operate based on a number of communication protocols, such as Bluetooth®, Wireless Fidelity (Wi-Fi), Near-Field Communications (NFC), ZigBee, and others.

The sensor data contained within the communications signals may be used by the server 106 to determine faults (for example, unknown faults that the sensors 104 were not able to determine) in the components of the vehicle 102. Using the communications signal, the sensors 104 may communicate the sensor data that may be used, e.g., to identify the faults in the components, among other possible functions. As an example, the communications component of the sensors 104 may communicate the sensor data containing various types of information. Non-limiting examples of the information may include a sensor identifier, a vehicle identifier, a driver identifier, a vehicle location, and other such information.

A server 106 is a computing device, which may be associated with the sensors 104, the analyst computer 108, and the database 110 via the network 112. The server 106 may include a processing unit. The processing unit may include a processor with computer-readable medium, such as a random access memory coupled to the processor. The server 106 may be running algorithms or computer executable program instructions. A single processor or multiple processors in a distributed configuration of the server 106 may execute the algorithms or the computer executable program instructions. The server 106 may interact with one or more software modules of a same or a different type operating within the vehicle fault diagnostics system 100.

Non-limiting examples of the processor may include a microprocessor, an application specific integrated circuit, and a field programmable object array, among others. Non-limiting examples of the server 106 may include a server computer, a workstation computer, a tablet device, and a mobile device (e.g., smartphone). While the vehicle fault diagnostics system 100 may include a single server 106, in some embodiments, the server 106 may include a number of computing devices operating in a distributed computing environment.

The server 106 may receive the identified faults in the vehicle 102 and associated sound signals from the communications component associated with the sensors 104. The server 106 may store the identified faults and the associated sound signals in a record of the vehicle 102 in the database 110. The server 106 may generate an electronic message containing the identified faults in the vehicle 102 and associated sound signals. The electronic message may further include information associated with the identified faults in the vehicle 102. The information may include steps for correcting or repairing the identified faults in the vehicle 102. In one embodiment, the server 106 may transmit the electronic message to the control unit of the vehicle 102. A display screen in the vehicle 102 may display the electronic message. In another embodiment, the server 106 may transmit the electronic message to the analyst computer 108. A graphical user interface of the analyst computer 108 may display the electronic message.

The server 106 may receive a notification from the communications component associated with the sensors 104. The notification may indicate a detection of the sounds signals, such as the unknown sound signals in the vehicle 102 by a first sensor. On receiving the notification, the server 106 may generate and transmit control signals to a recording device positioned within the vehicle 102. The recording device may be directly or indirectly associated with the first sensor. The recording device may record the sound signals originating in the vehicle 102. The recording device may store recorded sounds signals, such as the unknown sound signals in the sensor memory or the database 110. The server 106 may access the recorded sounds signals from the sensor memory or the database 110. The server 106 may process these unknown sound signals to generate the sensor data. In some embodiments, the server 106 may directly receive the sensor data associated with the unknown sound signals from the communications component associated with the sensors 104.

The server 106 may feed the sensor data in a sound analyzer device to identify the faults, such as the unknown faults in the components of the vehicle 102 that the sensors 104 were not able to determine using the reference sound signals. The sound analyzer device may include number of elements, which may reduce or eliminate any effects the noise may have on the recording device while recording the sound signals. The sound analyzer device may execute sound dampening algorithms to dampen impinging sound waves from the sensor data. The sound analyzer device may then determine an amplitude, a frequency, and a vibration pattern of audio in the sensor data. The server 106 may use information associated with the amplitude, the frequency, and the vibration pattern of the audio in the sensor data to first identify one or more components that may generate such sounds. Upon identification of the one or more components, the server 106 may then compare the sounds generated by each of these one or more components in all modes of operations with the sensor data. Based on results of the comparison step, the server 106 may identify at least one component that may potentially have produced the unknown sound signals. The server 106 may transmit the information associated with the at least one component that may potentially have produced the unknown sound signals to the analyst computer 108. The server 106 may also transmit the sensor data to the analyst computer 108. The analyst computer 108 may execute one or more sound analysis algorithms using the sensor data as an input.

The server 106 may host a vehicle diagnosis application accessible to the analyst computer 108 via the network 112. The vehicle diagnosis application may include algorithms or computer executable program instructions. The server 106 may be running the algorithms or the computer executable program instructions, which may be executed by a single processor or multiple processors in a distributed configuration.

The server 106 may interact with one or more software modules of a same or different type operating within the vehicle fault diagnostics system 100. For instance, the server 106 may execute software applications configured to host the vehicle diagnosis application (for example, Apache®, Microsoft IIS®), which may generate and serve various webpages to the analyst computer 108. The vehicle diagnosis application may be used to access the sensor data stored in the database 110, analyze the sensor data, and generate diagnosis reports using the sensor data. The vehicle diagnosis application may be also used to access the faults associated with the components of the vehicle 102 stored in the database 110, analyze the faults, and generate fault repair reports using the faults.

The server 106 may require analyst authentication based upon a set of analyst authorization credentials (for example, username, password, biometrics, cryptographic certificate) to allow access to the vehicle diagnosis application. In such implementations, the server 106 may access the database 110 configured to store analyst credentials. The server 106 may reference the database 110 in order to determine whether a set of entered credentials purportedly authenticating the analyst match an appropriate set of credentials that identify and authenticate the analyst. Similarly, in some implementations, the server 106 may generate and serve the webpages of the vehicle diagnosis application to the analyst computer 108 based upon information associated with the analyst.

An analyst computer 108 is a portable or a non-portable computing device that that the analyst may use to evaluate the faults associated with the components of the vehicle 102 and process the sensor data associated with the components of the vehicle 102. The analyst computer 108 may include a processor or a microprocessor for performing computations for carrying the functions of the analyst computer 108. Non-limiting examples of the processor may include, but not limited to, a microprocessor, an application specific integrated circuit, and a field programmable object array, among others. The processor may include a graphics processing unit specialized for rendering and generating computer-generated graphics. Non-limiting examples of the analyst computer 108 may include, but are not limited to, a cellular phone, a tablet computer, a head-mounted display, smart glasses, wearable computer glasses, a personal data assistant, a virtual reality device, an augmented reality device, or a personal computer. For ease of explanation, FIG. 1A show a single computing device functioning as the analyst computer 108. However, some embodiments may include a plurality of computing devices capable of performing tasks described herein.

The analyst computer 108 may be coupled to the database 110, the server 106, and the sensors 104 via the network 112. The analyst computer 108 may include a graphical user interface or an interactive dashboard on which the analyst may interact by means of an input device, such as a touch screen, a mouse, a keyboard, a keypad, among others. The analyst computer 108 may transmit credentials from analyst inputs to the server 106 from which the server 106 may authenticate the analyst. The analyst computer 108 may use the input devices to receive the analyst inputs, including various types of data inputs allowing for authentication, for example, username, passwords, certificates, and biometrics.

The graphical user interface of the analyst computer 108 may receive information from the server 106 and the sensors 104, and display the information to the analyst. The information may include the faults associated with the components of the vehicle 102. The information may also include the sensor data associated with the components of the vehicle 102. The analyst computer 108 may execute the vehicle diagnosis application running on an operating system of the analyst computer 108 using its graphical user interface. The vehicle diagnosis application may access the server 106 and/or the sensors 104 in order to issue requests or instructions to the server 106 and/or the sensors 104 to access or query the information from the server 106 and/or the sensors 104.

The execution of the vehicle diagnosis application may display interactive icons or buttons on the graphical user interface of the analyst computer 108. The triggering of the icons may generate a screen having a plurality of portions on the graphical user interface of the analyst computer 108. One portion of the screen may present an electronic form containing various diagnosis requests related to various components of the vehicle 102. The analyst computer 108 may select a diagnosis request on the graphical user interface of a particular component for which the analyst may need a diagnosis report. Upon the selection, the analyst computer 108 may issue queries or instructions to the server 106 and/or the sensors 104 to perform various fault identification tasks based on the diagnosis request, such as retrieving or updating the sensor data or the sound signals record associated with the particular component from the database 110. The server 106 and/or the sensors 104 may execute the fault identification tasks, and generate a diagnosis report for the particular component using updated sensor data or sound signals record associated with the particular component. The diagnosis report may include the one or more faults associated with the particular component. The server 106 and/or the sensors 104 may transmit the diagnosis report to the analyst computer 108. The analyst computer 108 may present the diagnosis report on the graphical user interface. The analyst may interact with the diagnosis report on the graphical user interface. In some embodiments, the analyst computer 108 may only receive the sensor data from the server 106 and/or the sensors 104, and the analyst computer 108 may execute one or more sound analysis algorithms using the sensor data as an input to identify the one or more faults. The analyst computer 108 may then generate the diagnosis report using the identified faults, which is presented on its graphical user interface where the analyst may interact with the diagnosis report.

The analyst computer 108 may automatically receive information associated with the faults related to various components of the vehicle 102 from the server 106 and/or the sensors 104. The server 106 and/or the sensors 104 may continually transmit the information associated with the faults to the analyst computer 108 as soon as the faults are detected based on processing of the sound signals originating from the various components of the vehicle 102. The faults may be related to a subject matter (e.g., a type of mechanical or electrical problem) or a procedural role (e.g., a time-sensitive fault). The faults may have a first data field indicating a nature of the potential problem and a second data field indicating a time-sensitive nature of the potential problem. Based on the data fields, the analyst computer 108 may receive the faults having the subject matter or the procedural data fields associated with credentials of the analyst. For instance, the credentials of the analyst specializing in the time sensitive faults would indicate to the analyst computer 108 that the analyst computer 108 should retrieve and present the faults having the data field indicating that the particular fault is time-sensitive.

The faults may be stored into dedicated databases or sub-databases of the database 110, where each sub-database is configured to store the faults with certain types of the faults. In such implementations, the analyst computer 108 may be limited to accessing certain sub-databases according to the credentials of the analyst operating the analyst computer 108. Similarly, the analyst computer 108 may receive updates or notification messages that the analyst computer 108 presents on the graphical user interface to the analyst. The server 106, the sensors 104, the database 110, or other device of the vehicle fault diagnostics system 100 may trigger and transmit the notifications to each analyst computer 108 having the analyst credentials with access attributes indicating a role of the analyst. For instance, the analyst may have the analyst credentials with the attributes that indicate the analyst specializes in handling the time-sensitive faults. When a new fault is detected or an existing fault is updated with the data field indicating the fault is time-sensitive, the server 106 or the sensors 104 may transmit the notification message to the analyst of the analyst computer 108.

The analyst computer 108 may have the graphical user interface that allows the analyst to mark or tag the faults associated with the various components of the vehicle 102. A data field in the record of each fault is updated to reflect the tag inputted by the analyst computer 108. In some instances, the tag reflects an analyst's concern that the fault may contain the data fields that could be cross-referenced and found in another fault to enable easy repair process of the fault. The server 106 may perform various forms of processing on the data fields, such as identifying which, if any, other faults contain the same data in corresponding data fields. In some embodiments, the server 106, the sensors 104, the analyst computer 108, or other device of the vehicle fault diagnostics system 100 may execute various models that indicate to the server 106 that the fault should be tagged. The faults may be tagged automatically when data fields in the fault matches a threshold number of data fields of a given model.

The analyst computer 108 may execute one or more protocols that permits the analyst to select the faults associated with the components of the vehicle 102 from the database 110 and then review or update a data record stored in the database 110 for the selected faults. Based on a score associated with the faults, the analyst computer 108 may present the analyst with the fault from the list of faults to address next. The score associated with the faults may prioritize a queue of the faults for the analyst computer 108. When the score associated with the faults is updated, the prioritization of the faults within the queue is also updated.

A database 110 may be hosted on one or more computing devices. The database 110 may be hosted on a number of computing devices including a non-transitory machine-readable storage medium and capable of performing the various tasks described herein. As shown in the FIG. 1A, the database 110 may be accessed by the server 106 and other devices of the vehicle fault diagnostics system 100 via the one or more networks 112. The database 110 may be hosted on a same physical computing device functioning as the server 106.

The database 110 may be in communication with a processor of the server 106 and/or the analyst computer 108. The database 110 may be part of the server 106 and/or the analyst computer 108. The database 110 may be a separate component in communication with the server 106 and/or the analyst computer 108. The database 110 may have a logical construct of data files, which are stored in non-transitory machine-readable storage media, such as, a hard disk or memory, controlled by software modules of a database program, and a database management system that executes the code modules for various data queries and management functions.

The database 110 is capable of storing data in a plain format and an encrypted version. The data may include records associated with a vehicle 102, the records associated with the components of the vehicle 102, and the records associated with the analysts. Non-limiting examples of what may be stored in the database 110 may include driver records that may comprise data fields describing the drivers, e.g., driver data, such as driver credentials (e.g., username, passwords, biometrics, encryption certificates), driver account data; document records that may include machine-readable computer files (e.g., word processing files), parsed portions of such computer files, or metadata associated with computer files; and application data that may include software instructions executed by the server 106 or data used by the applications executed by the server 106.

Figure 2:
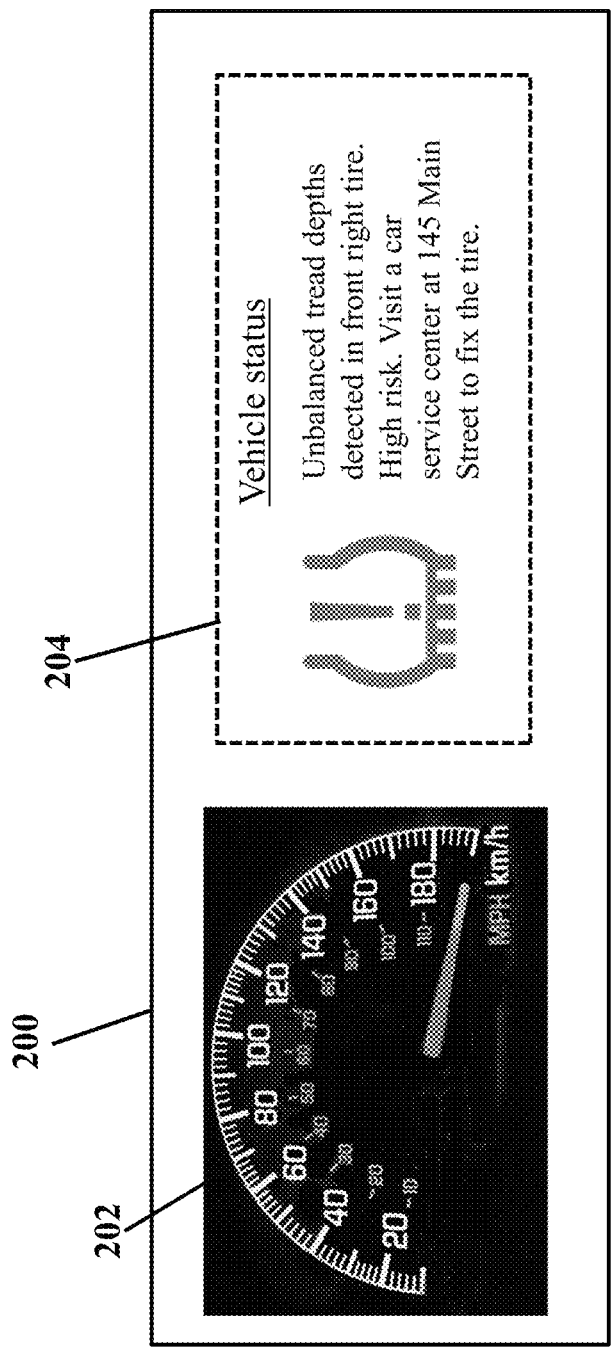
FIG. 2 shows a fault display on a dashboard of a vehicle, according to an embodiment.

FIG. 2 shows a dashboard 200 of a vehicle. The vehicle may also include a vehicle control unit. The vehicle control unit may include a processor, which may perform one or more operations according to one or more programming instructions. The processor may be capable of communicating with an audio sensor located within the vehicle using wired or wireless communication capabilities. Although a dashboard is shown in this embodiment, it is intended that the information can be displayed on a mobile phone or other computing device associated with a vehicle.

The processor may execute a vehicle diagnosis application, which may enable communication of system data between the audio sensor and the processor. The system data may include one or more inputs inputted by a driver of the vehicle on the dashboard 200. A first input may include a first command by the driver to start a sensing operation of the audio sensor. A second input may include a second command by the driver to start a recording operation of the audio sensor. The processor may transmit the first input and the second input to the audio sensor. The audio sensor may execute the first command and the second command to start the sensing operation and the recoding operation of the audio sensor.

The system data may further include information associated with a fault detected by the audio sensor. In one instance, the audio sensor may detect and record a first sound originating from the vehicle. The audio sensor may compare the first sound with a first set of known sounds, which are associated with a correct or proper operation of all components of the vehicle. When the first sound does not match any of the first set of known sounds, an anomaly is detected. The audio sensor may transmit a file of the first sound to the processor, which may process the file of the first sound using one or more machine learning algorithms. The processor may determine a first fault associated with a first component of the vehicle based on the processing of the first sound. In another instance, the audio sensor may compare a detected sound (for example, a second sound originating from the vehicle) with a second set of known sounds. The second set of known sounds may be associated with a set of faults that occur during an improper operation of the components of the vehicle. When the second sound match one of the second set of known sounds, a second fault associated with second sound is identified. The second fault is associated with a second component of the vehicle. The audio sensor may transmit the information associated with the second fault to the processor. The processor may determine whether the second fault is in a list of high risk faults stored in a database.

When the second fault is present within the list of the high risk faults, the processor may execute a web application. The processor may automatically input a search query on the web application to determine a nearby service center with respect to a current location of the vehicle that is able to fix the second fault. The web application may be linked with a GPS application to determine the current location of the vehicle. The web application may determine a name of the nearby service center and an address location of the nearby service center. This service center will be presented on the dashboard as an option for the driver. In one configuration, a navigation system on the vehicle can be programmed to direct the driver to that particular service center.

The dashboard 200 may be a control panel located directly ahead of a vehicle's driver and capable of displaying various instruments, such as a speedometer 202 and a display section 204. The display section 204 may include a screen for presenting one or more faults associated with one or more components of the vehicle, optionally including a graphical indicator representing a fault. The display section 204 may further present a name and a location of a repair mechanic for fixing the one or more faults. The processor may display the one or more faults and the name/location of the repair mechanic on the display section 204. In one non-limiting example, the display section 204 may present a fault corresponding to unbalanced tread depths in front right tire. The fault may be a high risk fault. The fault may be repaired at a car service center located at 145 Main Street.

Figure 3:
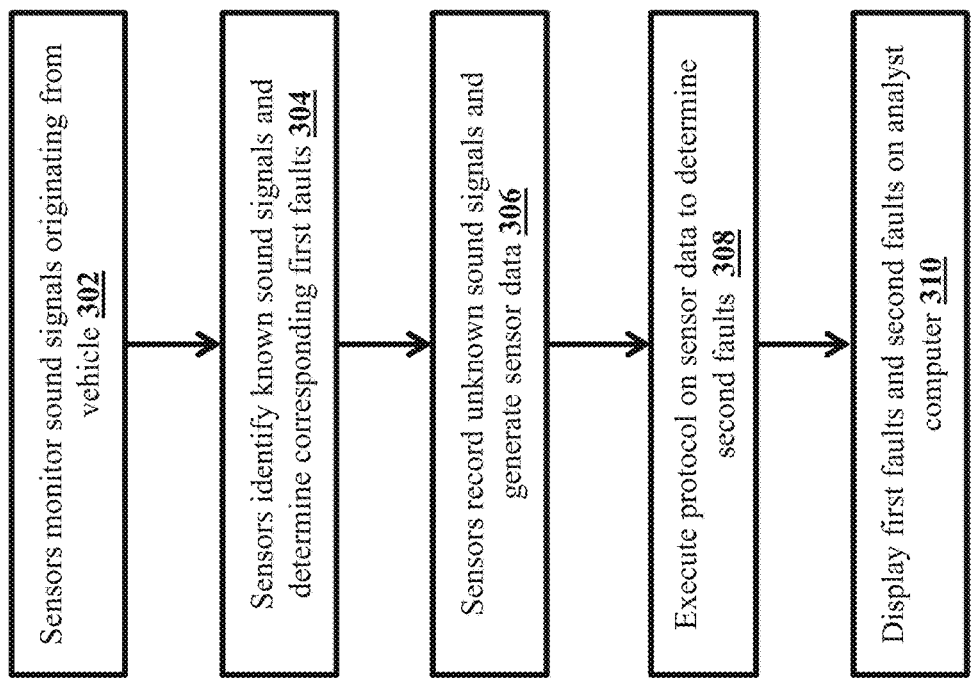
FIG. 3 shows a fault diagnosis method for identifying faults in a vehicle, according to an embodiment.

FIG. 3 illustrates a fault diagnosis method for identifying faults in a vehicle, according to a method 300. The method 300 shown in the FIG. 3 comprises execution steps 302, 304, 306, 308, and 310. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 of FIG. 3 is described as being executed by a single server or a single sensor. However, in some embodiments, the steps may be executed by multiple servers and sensors operating in a distributed system environment.

In a first step 302, one or more sensors may be placed in the vehicle. The one or more sensors may be positioned adjacent to the various components of the vehicle. In one embodiment, each sensor may include a sensor processor, a sensor memory, a microphone, and a communications component. In another embodiment, two or more sensors may share a single sensor processor, a single sensor memory, a single microphone, and a single communications component.

The microphone associated with the one or more sensors may monitor and detect a presence of one or more types of sound signals originating from the various components of the vehicle. In one embodiment, the microphone may operate while the vehicle is moving. In another embodiment, the microphone may operate in all positions of the vehicle, such as static and moving positons. The one or more types of sound signals may include known sound signals and unknown sound signals.

The microphone may store information associated with the one or more types of sound signals in the sensor memory. The sensor memory may store the information associated with reference sound signals. The reference sound signals may include a list of known sound signals. The sensor memory may also store a relationship between a plurality of different types of the known sound signals and a plurality of first faults. The plurality of first faults may be mechanical or electrical problems associated with the one or more components of the vehicle.

In a next step 304, a sensor processor associated with the one or more sensors may compare the one or more types of sound signals with the reference sound signals to identify the one or more known sound signals within the one or more types of sound signals. The one or more known sound signals may correspond to one or more first faults associated with at least one of the plurality of components of the vehicle. The sensor processor may transmit the information associated with the one or more first faults to a server.

Based on the comparison, the sensor processor may also identify the one or more unknown sound signals within the one or more types of sound signals. The one or more unknown sound signals are the sounds signals within the one or more types of sound signals that do not match any reference sound signals. Upon the detection of the unknown sound signals, the sensor processor may generate and transmit an alert regarding a presence of the unknown sound signals to the server.

In a next step 306, a server may generate and transmit an instruction to the one or more sensors to record the one or more unknown sound signals on receiving the alert. The one or more sensors may record the one or more unknown sound signals. The sensor processor may transform recorded unknown sound signals and generate sensor data. The sensor processor may pre-process the sensor data. During the pre-processing period, the sensor processor may remove unwanted noise from the sensor data using one or more filters. The sensor processor may generate pre-processed sensor data, which does not include the unwanted noise. The sensor processor may transmit the sensor data to the server.

In another embodiment, the server may generate and transmit a recording instruction to a recording device on receiving the alert. The recording device may record the one or more unknown sound signals. The recording device may transmit the recorded unknown sound signals to the server. The server may transform the recorded unknown sound signals and generate the sensor data. The server may pre-process the sensor data. During the pre-processing step, the server may remove unwanted noise from the sensor data using the one or more filters. The server may generate the pre-processed sensor data, which does not include the unwanted noise.

In a next step 308, a server may process and evaluate the pre-processed sensor data to determine one or more second faults associated with the at least one of the plurality of components of the vehicle. The second faults may be unknown faults, which may not have been determined based on comparison of the detected sound signals with the reference sound signals. During the processing step, the server may execute a protocol on the pre-processed sensor data to determine the one or more second faults. The protocol may be associated one or more sound processing algorithms. The sound processing algorithms may determine unique characteristics of the unknown sound signals associated with the pre-processed sensor data. The unique characteristics may include, but not limited to, pitch, loudness, tone, frequency, harmonics, and overtones of the unknown sound signals. The server may use information associated with the unique characteristics of the unknown sound signals to identify one or more faulty components, which may be configured to generate the sounds having similar unique characteristics. The one or more faulty components may have the second faults.

In a next step 310, a server may transmit the first faults and the second faults to an analyst computer. The analyst computer may execute a scoring algorithm to generate a score for each fault based on a data field associated with each fault. The data field may indicate a type of the fault and a risk of the fault. The analyst computer may include a graphical user interface, which may present the faults, such as the first faults and the second faults received from the server in order of their score. An analyst operating the graphical user interface may review or update a record of each fault displayed on the graphical user interface.

Figure 4:
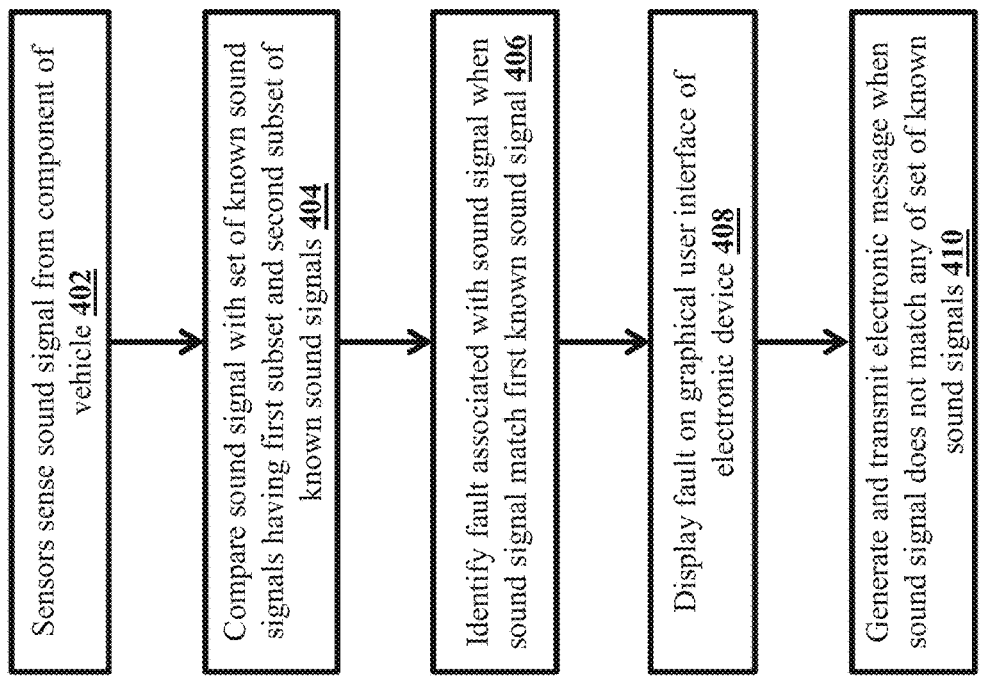
FIG. 4 shows a fault diagnosis method for identifying faults in a vehicle, according to an embodiment.

FIG. 4 illustrates a fault diagnosis method for identifying faults in a vehicle, according to a method 400. The method 400 shown in the FIG. 4 comprises execution steps 402, 404, 406, 408, and 410. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 400 of FIG. 4 is described as being executed by a single server or a single sensor. However, in some embodiments, the steps may be executed by multiple servers and sensors operating in a distributed system environment.

In a first step 402, one or more sensors may be placed in the vehicle. The one or more sensors may be positioned near various components of the vehicle. In one embodiment, each sensor may include a sensor processor, a sensor memory, a microphone, and a communications component. In another embodiment, two or more sensors may share a single sensor processor, a single sensor memory, a single microphone, and a single communications component.

The microphone associated with the one or more sensors may continuously sense a sound signal coming from the various components while the vehicle is in moving position or in static position. The one or more sensors may generate a recording of the sound signal coming from the various components. The one or more sensors may store the recording of the sound signal in the sensor memory. Each recording may include a date and a time of a detection of the sound signal.

The sensor memory may include information associated with reference sound signals. The reference sound signals may include a set of known sound signals. The set of known sound signals may include a first subset of known sound signals and a second subset of known sound signals. The first subset of known sound signals may be noises associated with improper operation of some of the components of the vehicle. The second subset of known sound signals may be noises associated with proper operation of some of the components of the vehicle.

The sensor memory may store a relationship between the first subset of known sound signals and one or more first faults associated with at least one of the plurality of components. The first faults may be mechanical or electrical problems associated with the one or more components. In one example, a first known sound signal (for instance, a particular jarring noise) of the first subset of known sound signals may be directly associated with a first fault (such as, a glitch in an engine). In another example, a second known sound signal (for instance, a particular vibrating noise) of the first subset of known sound signals may be directly associated with a second fault (such as, a glitch in a heater).

The sensor memory may further store a relationship between the second subset of known sound signals and proper operational sounds associated with the plurality of components. In one example, a third known sound signal (for instance, a particular trembling noise) of the second subset of known sound signals may be directly associated with a proper operation of tires when the vehicle is moving on unpaved road. In another example, a fourth known sound signal (for instance, a particular noise) of the second subset of known sound signals may be directly associated with a proper operation of tires when the vehicle is moving on normal road. In yet another example, a fifth known sound signal (for instance, a particular shaking noise) of the second subset of known sound signals may be directly associated with a proper operation of a suspension of the vehicle on an uphill road.

In a next step 404, the sensor processor associated with the one or more sensors may compare a portion of the sound signal with the set of known sound signals. Initially, the sensor processor may compare the portion of the sound signal with the second subset of known sound signals of the set of known sound signals. When the portion of the sound signal match with any of the second subset of known sound signals, the sensor processor may conclude that the various components of the vehicle are operating correctly. However, when the portion of the sound signal does not match with any of the second subset of known sound signals, the sensor processor may compare the portion of the sound signal with the first subset of known sound signals of the set of known sound signals.

In a next step 406, when the portion of the sound signal match a first known sound signal of the first subset of known sound signals, the sensor processor may query the sensor memory to identify a fault associated with the first known sound signal. The sensor processor may determine that the first known sound signal is associated with the first fault. The sensor processor may then associate the sound signal with the first fault.

In a next step 408, the sensor processor may transmit information associated with the first fault to an electronic device of the user. A graphical user interface of the electronic device may display the information associated with the first fault. The information may include a name of the first fault, a risk score of the first fault, and a location of nearest service center specializing in repair work of the first fault. The sensor processor may determine the location of nearest service center based on the location of the vehicle.

In a next step 410, when the portion of the sound signal does not match with any of the set of known sound signals, the sensor processor may retrieve the recording of the sound signal from the sensor memory and generate an electronic message. The electronic message may specify a likelihood of an anomaly (e.g., indicate an anomaly) in the plurality of components based on detection of the sound signal. The electronic message may also include the recording of the sound signal. The sensor processor may transmit the electronic message to the electronic device. The graphical user interface of the electronic device may display the electronic message.

Example

While a user is driving a car, a suspension system of the car may generate a first sound. Audio sensors within the car may sense and record the first sound. The audio sensors may determine if there is any problem associated with the suspension system based on analysis of the first sound. When the audio sensors identifies any problem, the audio sensors may display the problem on a display screen in the vehicle. The user may be able to view the problem on the display screen, which may enable prompt actions to repair the suspension system.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
   one or more sensors, each sensor positioned in association with one of a plurality of components on a vehicle operated by a user, the one or more sensors configured to:
   sense a sound signal from a component of the plurality of components; and
   one or more processors communicatively coupled to the one or more sensors and configured to:
   compare a portion of the sound signal with a set of known sound signals, the set of known sound signals comprising a first subset of known sound signals and a second subset of known sound signals, the first subset of known sound signals corresponding to one or more faults associated with at least one of the plurality of components, and the second subset of known sound signals corresponding to operational sounds associated with the plurality of components;
   when the portion of the sound signal matches a first known sound signal of the first subset of known sound signals:
      identify a fault associated with the first known sound signal and display the fault on a graphical user interface of an electronic device of the user;
      compare a risk score corresponding to the fault associated with the first known sound signal to a threshold; and
      upon determining that the risk score corresponding to the fault associated with the first known sound signal exceeds the threshold, display, on the graphical user interface of the electronic device of the user, at least one service center identified based on a location of the vehicle and the fault; and
   when the portion of the sound signal does not match any of the set of known sound signals, generate and transmit an electronic message to the electronic device, the electronic message indicating an anomaly in at least one of the plurality of components based on detection of the sound signal.

2. The system according to claim 1, wherein the one or more sensors are further configured to transmit the fault associated with the sound signal to an analyst computer or the one or more processors.

3. The system according to claim 1, wherein the one or more sensors are further configured to generate and transmit a recording of the sound signal to an analyst computer or the one or more processors.

4. The system according to claim 1, wherein each sensor comprises a sensor processor, a sensor memory, and a microphone.

5. The system according to claim 4, wherein the sensor memory is configured to store a relationship between the first subset of known sound signals and the one or more faults associated with the at least one of the plurality of components.

6. The system according to claim 4, wherein the microphone is configured to detect a presence of the sound signal originating from the component.

7. A method comprising:
   sensing, by a sensor positioned in association with one of a plurality of components on a vehicle operated by a user, a sound signal from a component of the plurality of components;
   comparing, by a processor in communication with the sensor, a portion of the sound signal with a set of known sound signals, the set of known sound signals comprising a first subset of known sound signals and a second subset of known sound signals, the first subset of known sound signals correspond to one or more faults associated with at least one of the plurality of components, and the second subset of known sound signals correspond to operational sounds associated with the plurality of components;
   when the portion of the sound signal matches a first known sound signal of the first subset of known sound signals:
      identifying, by the processor, a fault associated with the first known sound signal and display the fault on a graphical user interface of an electronic device of the user;
      comparing, by the processor, a risk score corresponding to the fault associated with the first known sound signal to a threshold; and
      upon determining that the risk score corresponding to the fault associated with the first known sound signal exceeds the threshold, displaying, by the processor, on the graphical user interface of the electronic device of the user, at least one service center identified based on a location of the vehicle and the fault; and
   when the portion of the sound signal does not match any of the set of known sound signals, generating and transmitting, by the processor, an electronic message to the electronic device, the electronic message indicating an anomaly in at least one of the plurality of components based on detection of the sound signal.

8. The method according to claim 7, transmitting, by the sensor, the fault associated with the sound signal to an analyst computer or the processor.

9. The method according to claim 7, generating and transmitting, by the sensor, a recording of the sound signal to an analyst computer or the processor.

10. The method according to claim 7, wherein each sensor comprises a sensor processor, a sensor memory, and a microphone.

11. The method according to claim 10, wherein the sensor memory is configured to store a relationship between the first subset of known sound signals and the one or more faults associated with the at least one of the plurality of components.

12. The method according to claim 10, wherein the microphone or the sensor processor is configured to detect a presence of the sound signal originating from the component.

13. A method comprising:
   identifying, by one or more sensors in a vehicle, one or more known sound signals from one or more types of sound signals generated by a plurality of components of the vehicle, wherein the one or more known sound signals correspond to one or more first faults associated with at least one of the plurality of components;

recording, by the one or more sensors, one or more unknown sound signals from the one or more types of sound signals to generate sensor data; and transmitting, by the one or more sensors, the sensor data to a server, wherein the server processes the sensor data to:

identify one or more second faults associated with at least one of the plurality of components;

identify at least one service center associated with a location of the vehicle and the one or more second faults;

compare a risk score corresponding to the one or more second faults to a threshold; and upon determining that the risk score corresponding to the one or more second faults exceeds the threshold, display, on a graphical user interface of an electronic device of a user, the at least one service center.

14. The method according to claim 13, further comprising receiving, by an analyst computer, information associated with the one or more second faults from the server, wherein the one or more second faults are presented on a user interface of the analyst computer.

15. The method according to claim 13, further comprising receiving, by an analyst computer, the one or more first faults from the one or more sensors, and wherein the one or more first faults are presented on a user interface of the analyst computer.

16. The method according to claim 13, further comprising generating and transmitting, by the one or more sensors, an alert regarding a presence of the one or more unknown sound signals to the server.

17. The method according to claim 13, wherein each sensor comprises a sensor processor, a sensor memory, and a microphone.

18. The method according to claim 17, wherein the sensor memory is configured to store a relationship between a plurality of different types of known sound signals and a plurality of first faults.

19. The method according to claim 17, wherein the sensor processor is configured to filter a recording of the one or more unknown sound signals to generate the sensor data.

20. The method according to claim 19, wherein the sensor processor is configured to store the recording of the one or more unknown sound signals in the sensor memory.

* * * * *